United States Patent
Felch et al.

(10) Patent No.: US 12,005,875 B2
(45) Date of Patent: Jun. 11, 2024

(54) VEHICLE BRAKE-BY-WIRE CONTROL SYSTEM

(71) Applicant: FORD GLOBAL TECHNOLOGIES, LLC, Dearborn, MI (US)

(72) Inventors: Harold John Felch, Novi, MI (US); Thomas Svensson, Leichlingen (DE); Harbind S Chahal, Novi, MI (US); Roberto Villegas Muriel, Atizapan de Zaragoza (MX)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 17/988,394

(22) Filed: Nov. 16, 2022

(65) Prior Publication Data

US 2024/0157915 A1    May 16, 2024

(51) Int. Cl.
B60T 7/04    (2006.01)
B60L 7/14    (2006.01)

(52) U.S. Cl.
CPC ............... B60T 7/042 (2013.01); B60L 7/14 (2013.01); *B60L 2260/22* (2013.01); *B60T 2260/09* (2013.01); *B60T 2270/82* (2013.01); *B60W 2540/10* (2013.01); *B60W 2710/18* (2013.01)

(58) Field of Classification Search
CPC ......... B60W 30/18181; B60W 30/184; B60W 2540/12; B60T 7/042; B60T 2260/09; B60T 2270/82
See application file for complete search history.

(56) References Cited

U.S. PATENT DOCUMENTS

| | | | |
|---|---|---|---|
| 9,002,608 B2 | 4/2015 | Crombez | |
| 10,189,357 B2 | 1/2019 | Zou et al. | |
| 10,351,111 B2* | 7/2019 | Hernandez | B60T 8/172 |
| 11,059,463 B2* | 7/2021 | Suzuki | B60T 7/045 |
| 11,214,274 B2 | 1/2022 | Hoop et al. | |
| 11,214,278 B2* | 1/2022 | Hoop | B60L 7/22 |
| 11,235,739 B2* | 2/2022 | Suzuki | B60T 13/586 |
| 2013/0103267 A1 | 4/2013 | Dewitt | |
| 2015/0142290 A1 | 5/2015 | Van Saanen | |

FOREIGN PATENT DOCUMENTS

| | | |
|---|---|---|
| CN | 106891881 A | 6/2017 |
| DE | 4017045 A1 | 11/1991 |
| EP | 3183795 B1 | 12/2018 |
| JP | 4285458 B2 | 6/2009 |

* cited by examiner

*Primary Examiner* — Huan Le

(74) *Attorney, Agent, or Firm* — Lorne Forsythe; Brooks Kushman P.C.

(57) ABSTRACT

A vehicle includes a brake-by-wire system having a brake pedal and a first sensor configured to output a signal indicative of a position of the brake pedal. A controller is in communication with the sensor and is programmed to enable and disable a one-pedal driving mode based on a user-selected setting. The controller is further programmed to, in response to the signal of the first sensor being valid and the one-pedal driving mode being disabled, enable the one-pedal driving mode regardless of the user-selected setting.

20 Claims, 3 Drawing Sheets

VEHICLE BRAKE-BY-WIRE CONTROL SYSTEM

TECHNICAL FIELD

This disclosure relates to vehicles having brake-by-wire systems and one-pedal driving modes.

BACKGROUND

Electrified vehicles, such as fully electric and hybrid electric vehicles, include at least one electric machine for propelling the vehicle. The electric machine is powered by a traction battery that supplies energy to the electric machine, which reduces a state of charge (SOC) of the battery. Many electrified vehicles are capable of regenerative braking to recharge the battery by converting mechanical power into electrical power. Some electric vehicles offer one-pedal driving.

SUMMARY

According to one embodiment, a vehicle includes a brake-by-wire system having a brake pedal and a first sensor configured to output a signal indicative of a position of the brake pedal. A controller is in communication with the sensor and is programmed to enable and disable a one-pedal driving mode based on a user-selected setting. The controller is further programmed to, in response to the signal of the first sensor being valid and the one-pedal driving mode being disabled, enable the one-pedal driving mode regardless of the user-selected setting.

According to another embodiment, a vehicle includes a brake-by-wire system having a brake pedal, friction brakes, and first and second sensors each being configured to output data indicative of a position of the brake pedal. A controller is in communication with the first and second sensors. The controller is programmed to enable and disable a one-pedal driving mode based on a user-selected setting, and, in response to the data from the first and second sensors differing beyond a threshold and the one-pedal driving mode being disabled, enable the one-pedal driving mode regardless of the user-selected setting such that operation of the friction brakes is based on accelerator-pedal position.

According to yet another embodiment, a method of operating a vehicle brake-by-wire system includes disabling a one-pedal driving mode based on a user-selected setting; and, in response a sensed condition and the one-pedal driving mode being disabled, enabling the one-pedal driving mode regardless of the user-selected setting.

DETAILED DESCRIPTION

Figure 1:
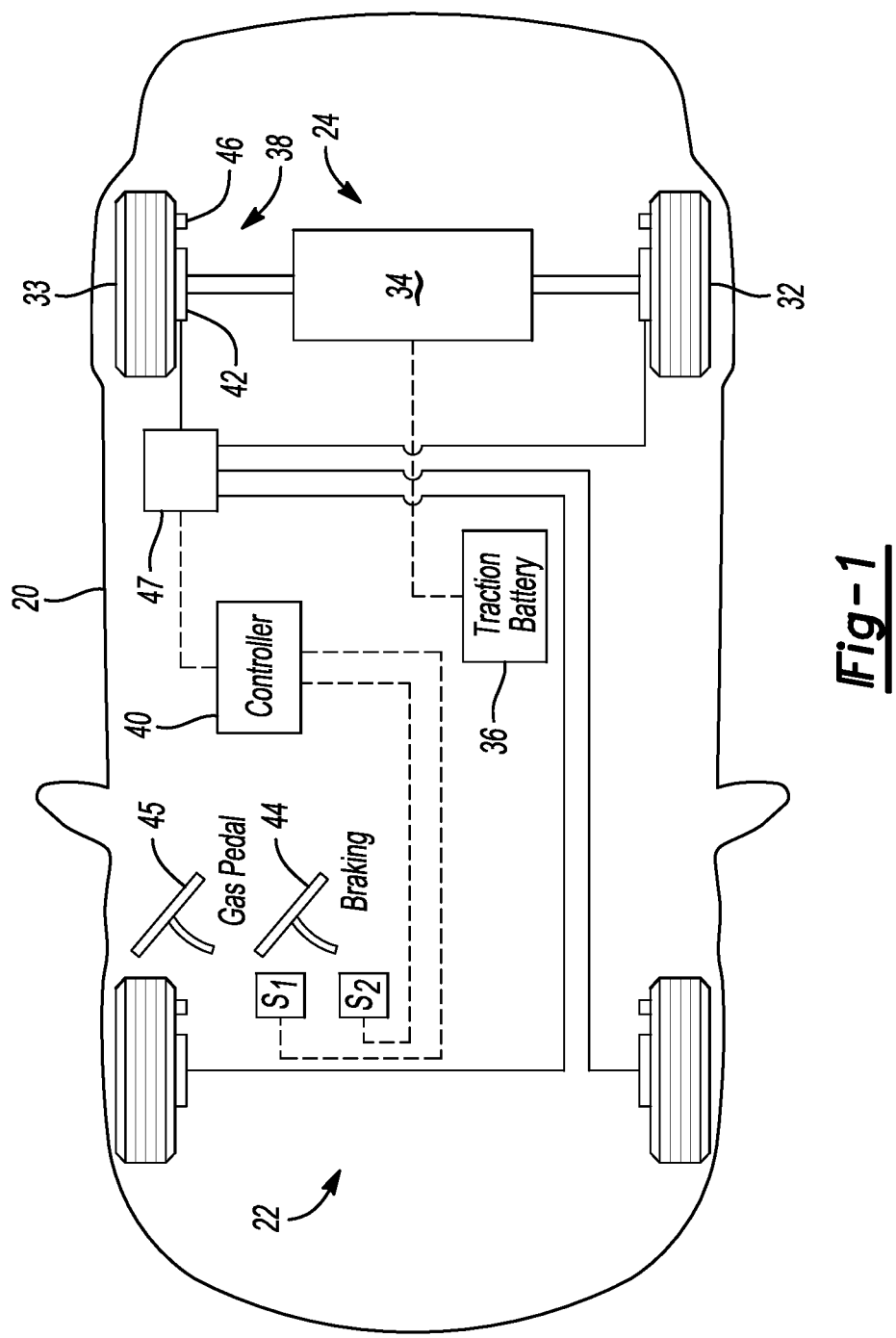
FIG. 1 illustrates a schematic diagram of an example electrified vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Traditionally, drivers controlled the vehicle speed by modulating the accelerator and brake pedals. The driver depresses the accelerator pedal to go faster and applies the brake pedal to slow down. Modern vehicles present an opportunity for an alternative control called one-pedal driving (one-pedal driving mode) in which the vehicle can be controlled using only the accelerator pedal to both accelerate and decelerate the vehicle. In the one-pedal driving mode, the driver commands a raw driver-demanded wheel torque by actuating the accelerator pedal. Depending upon the vehicle speed and the accelerator pedal position the raw driver-demanded torque may be a positive value or a negative value. A positive value indicates a propulsion torque, whereas a negative value indicates a braking torque. (A negative driver-demanded torque may also be referred to herein as "a target braking torque."). The vehicle may provide the target braking torque using either the powertrain, e.g., regenerative braking, the friction brakes, or a combination of both.

The raw driver-demanded torque may be filtered and rate limited to smooth the acceleration and deceleration of the vehicle. Once filtered and rate limited, the torque may be referred to as a "commanded wheel torque." The rate limit constrains the step change between the previous commanded wheel torque and the subsequent commanded wheel torque. The vehicle may be programmed with a plurality of different filters and rate limits that are applied in difference situations. For example, different filters and rate limits may be used depending upon the vehicle speed, e.g., a lower rate limit may be used when the vehicle is at low speed and a higher rate limit may be used when the vehicle is at high speeds. (A higher rate limit permits a larger step change than a lower rate limit.) Different filters and rate limits may also be used based on the mode of the vehicle. That is, the vehicle may include a set of rate limits and filters when the vehicle is in a two-pedal drive mode and may use another set of rate limits and filters when the vehicle is in a one-pedal drive mode.

The one-pedal drive mode may be configured to bring the vehicle to a complete stop when the driver has released the accelerator pedal without application of the brake pedal. The vehicle may be stopped using regenerative braking, friction braking, or both. Once the vehicle is stopped, the friction brakes may be applied to hold the vehicle stationary.

Referring to FIG. 1, an electrified vehicle 20 is illustrated as a fully electric vehicle but, in other embodiments, the vehicle 20 may be a hybrid-electric vehicle that includes an internal-combustion engine, or a conventionally powered vehicle that only includes an engine. The vehicle 20 is shown as being two-wheel drive (such as front-wheel drive or rear-wheel drive) but may be all-wheel drive (AWD) in other embodiments. The vehicle 20 may include a powertrain 24 including a powerplant, e.g., an electric machine 34, capable of operating to accelerate (propel) and brake the vehicle 20.

The electric machine 34 is operably coupled to driven wheels 30 and 32. A gearbox (not shown) may be included to change a speed ratio between the electric machine 34 and the wheels 30, 32. The electric machine may be one or more electric machines. The electric machine 34 is capable of acting as motor to provide a positive torque to propel the vehicle 20 and is capable of acting as a generator to provide a negative torque to brake the vehicle such as via regenerative braking. The electric machine 34 may be a permanent magnet three-phase alternating current (AC) electric motor or other suitable type.

The electric machine 34 is powered by one or more traction batteries, such as traction battery 36. The traction battery 36 stores energy that can be used by the electric machine 34. The traction battery 36 may provide a high-voltage direct current (DC) output from one or more battery cell arrays, sometimes referred to as battery cell stacks, within the traction battery 36. The battery cell arrays include one or more battery cells. The battery cells, such as a prismatic, pouch, cylindrical, or any other type of cell, convert stored chemical energy to electrical energy. The cells may include a housing, a positive electrode (cathode), and a negative electrode (anode). An electrolyte allows ions to move between the anode and cathode during discharge, and then return during recharge. Terminals may allow current to flow out of the cell for use by the vehicle 20. Different battery pack configurations may be available to address individual vehicle variables including packaging constraints and power requirements. The battery cells may be thermally adjusted with a thermal management system.

The traction battery 36 may be electrically connected to one or more power-electronics modules through one or more contactors. The module may be electrically connected to the electric machine 34 and may provide the ability to bi-directionally transfer electrical energy between the traction battery 36 and the electric machine 34. For example, a traction battery 36 may provide a DC voltage while the electric machine 34 may require a three-phase AC. The power-electronics module may convert the DC voltage to a three-phase AC voltage as required by the electric machines. In a generator mode, which may be during regenerative braking, the power-electronics module may convert the three-phase AC voltage from the electric machine 34 acting as a generator to the DC voltage required by the traction battery 36.

The vehicle 20 includes one or more controllers 40 in electric communication with a plurality of vehicle systems and is configured to coordinate functionality of the vehicle. The controller 40 may be a vehicle-based computing system that includes one or more controllers that communicate via a serial bus (e.g., controller area network (CAN)) or via dedicated electrical conduits. The controller 40 generally includes any number of microprocessors, ASICs, ICs, memory (e.g., FLASH, ROM, RAM, EPROM and/or EEPROM) and software code to co-act with one another to perform a series of operations. The controller 40 also includes predetermined data, or "lookup tables," that are based on calculations and test data, and are stored within the memory. The controller 40 may communicate with other vehicle systems and controllers over one or more wired or wireless vehicle connections using common bus protocols (e.g., CAN and LIN). Used herein, any reference to "a controller" refers to one or more controllers. The controller 40 may include battery energy control module (BECM) that operates at least the traction battery, a powertrain control module (PCM) that operates at least the electric machine, and a brake control module that controls the braking system 38.

The controllers communicate with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by a controller within each of the subsystems identified above.

The braking system 38 may be a hydraulic system, an electric system, or a combination of electric and hydraulic. The braking system 38 is a brake-by-wire system that uses pedal sensors ($S_1$ and $S_2$) and actuators to engage the brakes rather than a direct mechanical connection between the brake pedal and the master cylinder. The pedal sensors ($S_1$ and $S_2$) are configured to sense movement of the brake pedal and output a signal indicative of this movement. The signals include data indicative of a position of the brake pedal 44, which may be expressed as a percentage of depression. The pedal sensors ($S_1$ and $S_2$) may be redundant sensors designed to output the same value i.e., within a threshold, during proper operation of the system. The pedal sensors ($S_1$ and $S_2$) output this data to a braking control module of the controller(s) 40.

The brake system 38 may include a master cylinder 47 in fluid communication with a plurality of friction brakes 42 located at each of the wheels. The master cylinder 47 is actuated by the controller 40 based on the received data from the pedal sensors ($S_1$ and $S_2$) as well as other factors. This is just one example and other types of brake by wire systems are contemplated, such as electro-mechanical brakes. Modern vehicles typically have disc brakes; however, other types of friction brakes are available, such as drum brakes. In an example embodiment, each of the brakes 42 are in fluid communication with a valve body (not shown) via brake lines configured to deliver fluid pressure from the master cylinder 47 to a caliper of the brakes 42. The valve body may include a plurality of valves configured to provide independent fluid pressure to each of the brakes 42 according to ABS. The braking system 38 also includes associated wheel-speed sensors 46 each located at one of the wheels. Each sensor 46 is configured to output a wheel-speed signal to the controller 40 indicative of a measured wheel speed.

The vehicle 20 is configured to brake using powertrain braking (e.g., regenerative braking), friction braking, or a combination thereof. The brake control module includes programming for aggregating a demanded braking torque between the electric machine 34 and the friction brakes 42. The demanded braking torque may be based on driver input, e.g., a position of the brake pedal 44, or by the controller 40 in a two-pedal driving mode. The aggregator may be programmed to slow the vehicle using regenerative braking whenever possible and apply the friction brakes 42 when necessary.

The vehicle 20 includes an accelerator pedal 45. The accelerator pedal 45 includes a range of travel from a released position to a fully depressed position and indeterminate positions therebetween. The released position may be considered a zero percent position and the fully depressed position may be considered a 100 percent position. Releasing the pedal may be referred to as decreasing the accelerator pedal position, and applying the pedal may be referred to as increasing the accelerator pedal position. The accelerator pedal 45 includes an associated sensor (not shown) that senses the position of the pedal 45. The sensor is configured to output a pedal-position signal to the controller 40 that is indicative of a sensed position of the pedal 45, i.e., an accelerator pedal position. The accelerator pedal 45 is used by the driver to command a desired speed and torque of the vehicle. That is, the accelerator pedal 45 is used by the driver to set a driver-demanded torque. The driver-demanded torque may be a positive value or a negative value. A positive value indicates a propulsion torque, whereas a negative value indicates a braking torque. (A negative driver-demanded torque may also be referred to herein as "a target braking torque.")

The controller 40 may be programmed to receive the pedal-position signal and determine the driver-demanded torque based on pedal position and other factors such as vehicle speed. During a one-pedal driving mode, the accelerator pedal is used to set a target vehicle propulsion torque when the driver-demanded torque is positive was well as a target braking torque when the driver-demanded torque is negative. The controller 40 may include multiple lookup tables or maps for determining the driver-demanded torque. These maps indicate the driver-demanded torque based on inputs such as accelerator pedal position, vehicle speed, and other factors. Different maps may be used in different drive modes. For example, one or more maps may be use when the vehicle is in a two-pedal driving mode and another map may be used when the vehicle is in a one-pedal driving mode. The maps associated with the one-pedal drive mode may include more aggressive negative driver-demanded torque values so that the vehicle is braked (powertrain, friction, or both) in response to the accelerator pedal being released so that application of the brake pedal is unnecessary in most situations.

The vehicle may include a human machine interface (HMI) for manually activating or deactivating the one-pedal driving mode. For example, the vehicle may include a touchscreen radio head with various menus and settings. One of these settings may the activation or deactivation of one-pedal driving. For example, one of the menus may include a selectable icon of a capacitive touchscreen that can be selected to activate and deactivate the one-pedal driving mode.

The vehicle may override the user's deactivation of the one-pedal driving mode when one or more of the signals from the pedal sensors ($S_1$ and $S_2$) is flagged for error. For example, the vehicle may reactivate the one-pedal driving mode when one of the signals from the sensors is unavailable, or both of the signals are unavailable, or when the signals do not match i.e., differ by more than a threshold depending upon the embodiment.

Control logic or functions performed by controller 40 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 40. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 2:
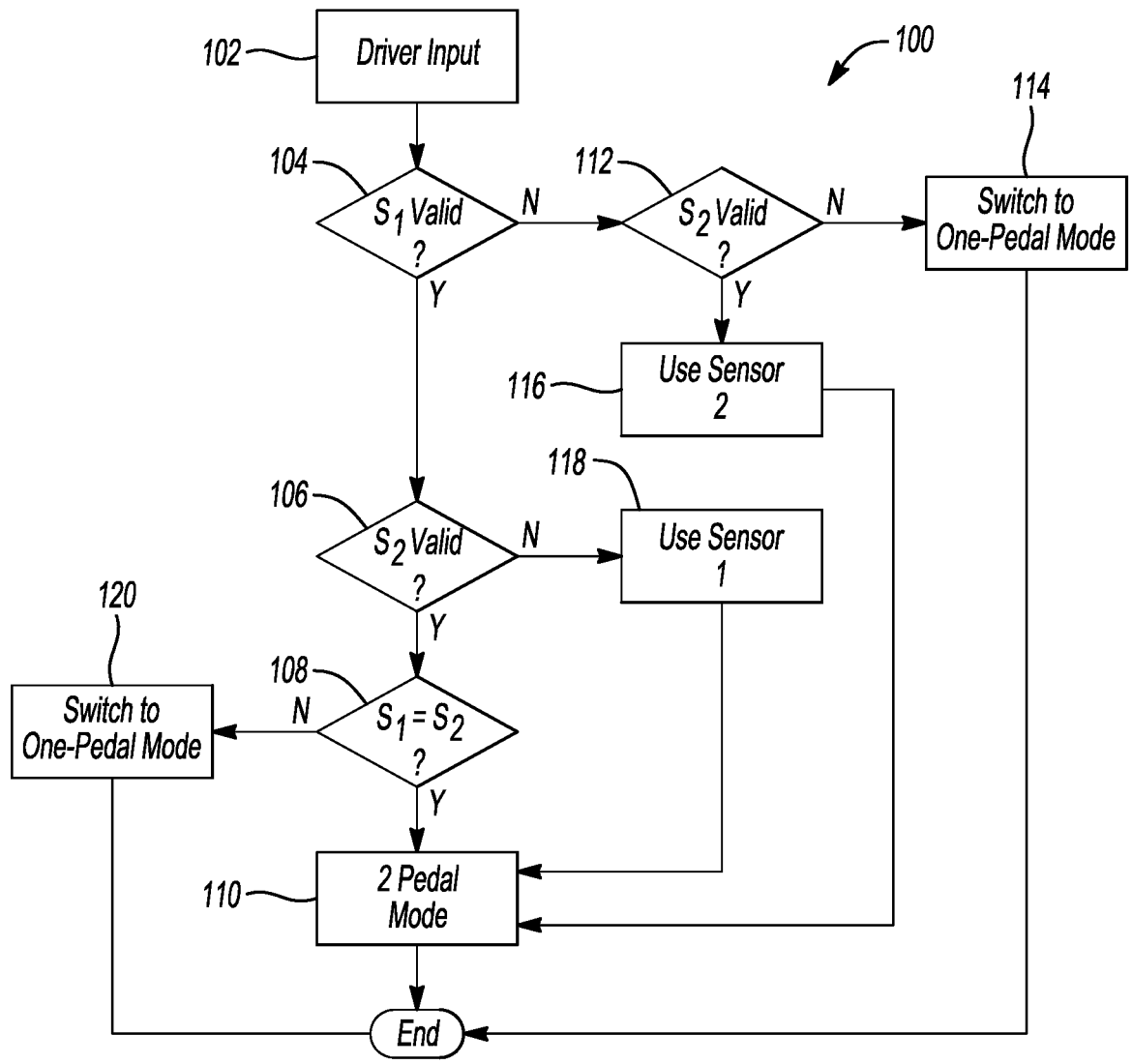
FIG. 2 illustrates a flow chart of an algorithm for controlling one or more aspects of a brake-by-wire system.

FIG. 2 is a flowchart 100 of an algorithm for controlling one or more aspects of the vehicle braking system. The flowchart begins at operation 102 in response to driver input at the brake pedal. At operation 104, the controller determines if a signal is received from the first sensor ($S_1$) and if it is valid. The signal may be validated, for example, by comparing the data to a range of reasonable values, or by other means known in the art. If yes, control passes to operation 106 and the controller determines if the signal received from the second sensor ($S_2$) is available and/or valid. If yes, control passes to operation 108 in the controller compares the data of the first and second brake-pedal sensors to determine if the values are within a threshold that is indicative of data match. If yes, the vehicle remains in two-pedal mode at operation 110 and the braking system is controlled based on the data from the first and second brake-pedal sensors ($S_1$ and $S_2$).

If no at operation 104, control passes to operation 112 and the controller determines if the signal from the second brake pedal sensor is available and/or valid. If no, control passes to operation 114 and the controller activates the one-pedal driving mode thus overriding the user's previous deactivation of the one-pedal driving mode. If yes at operation 112, the controller assigns the second sensor for use in determining the brake pedal position and the vehicle remains in the two-pedal mode.

If no at operation 106, control passes to operation 118 and the controller assigns the first brake-pedal sensor for use in determining the brake pedal position and the vehicle remains in the two-pedal mode.

If no at operation 108, control passes to operation 120 and the controller activates the one-pedal driving mode thus overriding the user's previous deactivation of the one-pedal driving mode.

Figure 3:
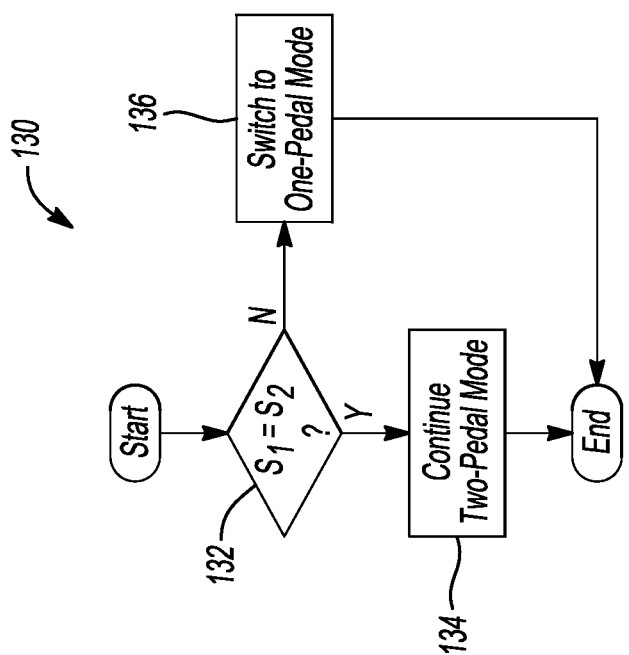
FIG. 3 illustrates another flow chart of an algorithm for controlling one or more aspects of a brake-by-wire system.

FIG. 3 illustrates an alternative embodiment of an algorithm 130 for controlling one or more aspects of the braking system. In this embodiment, the decision to remain in the two-pedal mode or switch to the one-pedal mode is based solely on the first and second brake pedal signals matching. At operation 132, the controller determines if the data from the first and second brake-pedal sensors matches i.e., is within a threshold. If yes, control passes to operation 134 and the vehicle remains in the two-pedal mode. If no at operation 132, control passes to operation 136 and the controller activates the one-pedal driving mode thus overriding the user's previous deactivation of the one-pedal driving mode.

Figure 4:
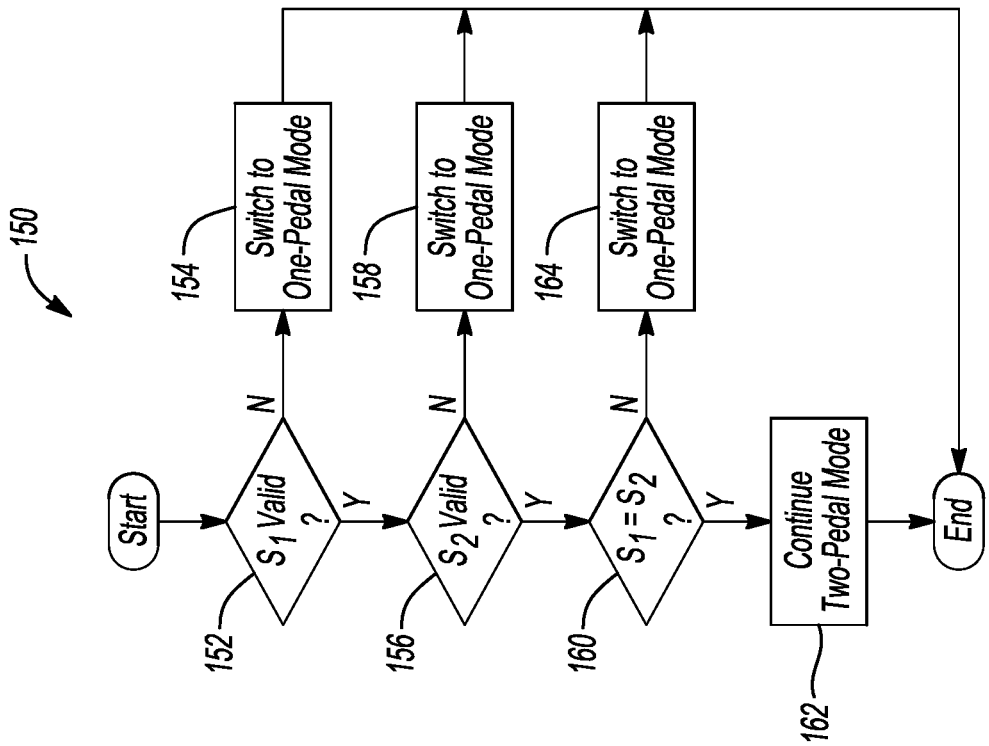
FIG. 4 illustrates a flow chart of yet another algorithm for controlling one or more aspects of a brake-by-wire system.

FIG. 4 illustrates yet another alternative embodiment of an algorithm 130 for controlling one or more aspects of the braking system. At operation 152, the controller determines if the signal from the first brake pedal sensor is available and/or valid. If no, control passes to operation 154 and the controller activates the one-pedal driving mode thus overriding the user's previous deactivation of the one-pedal driving mode. If yes, control passes to operation 156 and the controller determines if the signal from the second brake pedal sensor is available and/or valid. If no, control passes to operation 158 and the controller activates the one-pedal driving mode thus overriding the user's previous deactivation of the one-pedal driving mode. If the second signal is also valid, control passes to operation 160 and the controller determines if the first and second signals of the first and second brake pedal sensors matches, i.e., is within a threshold. If yes, control passes to operation 162 and the two-pedal mode continues. If no, control passes to operation 164 and the controller activates the one-pedal driving mode thus overriding the user's previous deactivation of the one-pedal driving mode.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a brake-by-wire system including a brake pedal and a first sensor configured to output a signal indicative of a position of the brake pedal; and
   a controller in communication with the sensor, the controller being programmed to:
      enable and disable a one-pedal driving mode based on a user-selected setting, and
      in response to the signal of the first sensor being valid and the one-pedal driving mode being disabled, enable the one-pedal driving mode regardless of the user-selected setting.

2. The vehicle of claim 1, wherein the brake-by-wire system further includes a second sensor configured to output a second signal indicative of the position of the brake pedal, wherein the controller is further programmed to, in response to the second signal of the second sensor being invalid and the one-pedal driving mode being disabled, enable the one-pedal driving mode regardless of the user-selected setting.

3. The vehicle of claim 1, wherein the brake-by-wire system further includes a second sensor configured to output a second signal indicative of the position of the brake pedal, wherein the controller is further programmed to, in response to data from the first and second sensors differing beyond a threshold and the one-pedal driving mode being disabled, enable the one-pedal driving mode regardless of the user-selected setting.

4. The vehicle of claim 1, wherein the brake-by-wire system further includes a second sensor configured to output a second signal indicative of the position of the brake pedal, wherein the controller is further programmed to, in response to both the signal of the first sensor and the second signal of the second sensor being invalid and the one-pedal driving mode being disabled, enable the one-pedal driving mode regardless of the user-selected setting.

5. The vehicle of claim 1, wherein the brake-by-wire system further includes a second sensor configured to output a second signal indicative of the position of the brake pedal, wherein the controller is further programmed to, in response to (i) the signals of the sensor and second sensor being valid, (ii) data from the first and second sensors differing beyond a threshold, and (iii) and the one-pedal driving mode being disabled, enable the one-pedal driving mode regardless of the user-selected setting.

6. The vehicle of claim 1, wherein the brake-by-wire system further includes friction brakes.

7. The vehicle of claim 1 further comprising an accelerator pedal, wherein the controller is further programmed to, in response to being in the one-pedal driving mode, command braking torque to the brake-by-wire system based on a position of the accelerator pedal.

8. The vehicle of claim 1 further comprising an electric machine configured to power driven wheels.

9. A vehicle comprising:
   a brake-by-wire system including a brake pedal, friction brakes, and first and second sensors each being configured to output data indicative of a position of the brake pedal; and
   a controller in communication with the first and second sensors, the controller being programmed to:
      enable and disable a one-pedal driving mode based on a user-selected setting, and
      in response to the data from the first and second sensors differing beyond a threshold and the one-pedal driving mode being disabled, enable the one-pedal driving mode regardless of the user-selected setting such that operation of the friction brakes is based on accelerator-pedal position.

10. The vehicle of claim 9, wherein the controller is further programmed to, in response to the data of the first sensor or the second sensor being invalid and the one-pedal driving mode being disabled, enable the one-pedal driving mode regardless of the user-selected setting.

11. The vehicle of claim 9, wherein the controller is further programmed to, in response to the data of both the first and second sensors being invalid and the one-pedal driving mode being disabled, enable the one-pedal driving mode regardless of the user-selected setting.

12. The vehicle of claim 9 further comprising an accelerator pedal, wherein the controller is further programmed to, in response to being in the one-pedal driving mode, command braking torque to the brake-by-wire system based on a position of the accelerator pedal.

13. The vehicle of claim 9, wherein the controller is further programmed to, in response to the data from the first and second sensors being with the threshold and the one-pedal driving mode being disabled, continue operation in a two-pedal driving mode.

14. The vehicle of claim 9 further comprising an electric machine configured to power driven wheels.

15. A method of operating a vehicle brake-by-wire system comprising:
  disabling a one-pedal driving mode based on a user-selected setting; and
  in response to a sensed condition and the one-pedal driving mode being disabled, enabling the one-pedal driving mode regardless of the user-selected setting.

16. The method of claim 15 further comprising:
  receiving data from a first brake pedal position sensor, wherein the sensed condition is that the data is invalid.

17. The method of claim 16 further comprising:
  receiving data for a second brake pedal position sensor; and
  in response to the data of the second sensor being invalid and the one-pedal driving mode being disabled, enabling the one-pedal driving mode regardless of the user-selected setting.

18. The method of claim 16 further comprising:
  receiving data from a second brake pedal position sensor; and
  in response to the data from the first and second sensors differing beyond a threshold and the one-pedal driving mode being disabled, enabling the one-pedal driving mode regardless of the user-selected setting.

19. The method of claim 16 further comprising:
  receiving data from a second brake pedal position sensor; and
  in response to (i) the data of the first and second sensors being valid, (ii) the data from the first and second sensors differing beyond a threshold, and (iii) and the one-pedal driving mode being disabled, enabling the one-pedal driving mode regardless of the user-selected setting.

20. The method of claim 15 further comprising:
  receiving data from an accelerator pedal position sensor; and
  in response to being in the one-pedal driving mode, commanding braking torque based on the data from the accelerator pedal position sensor.

* * * * *